(12) United States Patent
Gabrielson (10) Patent No.: US 9,110,861 B2
(45) Date of Patent: *Aug. 18, 2015

(54) MANAGING HOST COMPUTING DEVICES WITH A HOST CONTROL COMPONENT

(71) Applicant: Amazon Technologies, Inc., Reno, NV (US)

(72) Inventor: Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,742

(22) Filed: May 12, 2014

(65) Prior Publication Data

US 2014/0365756 A1 Dec. 11, 2014

Related U.S. Application Data

(63) Continuation of application No. 13/223,137, filed on Aug. 31, 2011, now Pat. No. 8,725,998.

(51) Int. Cl.
*G06F 9/24* (2006.01)
*G06F 15/177* (2006.01)
*G06F 9/44* (2006.01)
*G06F 11/07* (2006.01)
*H04L 12/24* (2006.01)
*H04L 12/26* (2006.01)
*G06F 11/14* (2006.01)

(52) U.S. Cl.
CPC ............... *G06F 15/177* (2013.01); *G06F 9/24* (2013.01); *G06F 9/4408* (2013.01); *G06F 11/07* (2013.01); *G06F 11/076* (2013.01); *G06F 11/0709* (2013.01); *G06F 11/14* (2013.01); *H04L 41/0813* (2013.01); *H04L 43/00* (2013.01)

(58) Field of Classification Search
USPC .................................................. 713/1, 2, 300
See application file for complete search history.

(56) References Cited

U.S. PATENT DOCUMENTS

| | | | |
|---|---|---|---|
| 8,725,998 B1 * | 5/2014 | Gabrielson | 713/2 |
| 2005/0076255 A1 | 4/2005 | Bresniker et al. | |
| 2006/0224764 A1 | 10/2006 | Shinohara et al. | |
| 2008/0172553 A1 | 7/2008 | Childress et al. | |
| 2009/0022058 A1 | 1/2009 | Li et al. | |
| 2009/0307476 A1 | 12/2009 | Khatri et al. | |
| 2012/0134085 A1 | 5/2012 | Gau et al. | |
| 2012/0286723 A1 | 11/2012 | Ukita et al. | |
| 2013/0054788 A1 | 2/2013 | Coddry et al. | |

* cited by examiner

*Primary Examiner* — Vincent Tran
(74) *Attorney, Agent, or Firm* — Knobbe, Martens, Olson & Bear LLP (57) ABSTRACT

Systems and methods are disclosed which facilitate the management of host computing devices through the utilization of a host computing device control component. The host computing device control component includes a state monitoring component that monitors operating states of the control component and a group of associated host computing devices. Based on a determination of a power event, the state monitoring component causes the initiation of a reboot of the grouping of host computing devices based on exchange priority information and additional reboot parameters.

20 Claims, 9 Drawing Sheets

MANAGING HOST COMPUTING DEVICES WITH A HOST CONTROL COMPONENT

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. Each single physical computing device can be generally referred to as a host computing device. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In conjunction with the utilization of virtualization technologies, data centers can physically organize sets of host computing devices to allow the host computing devices to share computing device resources, such as power or communication network connectivity. Such physical organization can correspond to physical racks in which the hosting computing devices are mounted, generally referred to as racks of host computing devices. As the number of racks of host computing devices increases, service providers associated with data centers have difficulty distinguishing between errors or faults associated with individual host computing devices, shared resources associated with a particular rack or distributed components utilized to manage the host computing devices. Additionally, in the event of a large scale power outage, data center power resources can be severely impacted the host computing devices are rebooted.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of host computing devices. Specifically, systems and methods are disclosed which facilitate the management of host computing devices through the utilization of a host computing device control component, or control component. A set of host computing devices can be organized into a physical rack. Additionally, a host computing device control component is associated with each physical rack. In one aspect, the host computing device control component is in communication with the set of host computing devices to monitor performance or manage the operation of various aspects of the host computing devices in the corresponding rack. In another aspect, the control component includes a separate state monitoring component that monitors operating states of the control component and manages power events associated with one or more the host computing devices. The state monitoring component includes a power supply separate from the control component power supply, a state processing component, a visual indicator interface, and a separate communication component to facilitate the management of the rebooting of host computing devices in the event of a power event.

Figure 1:
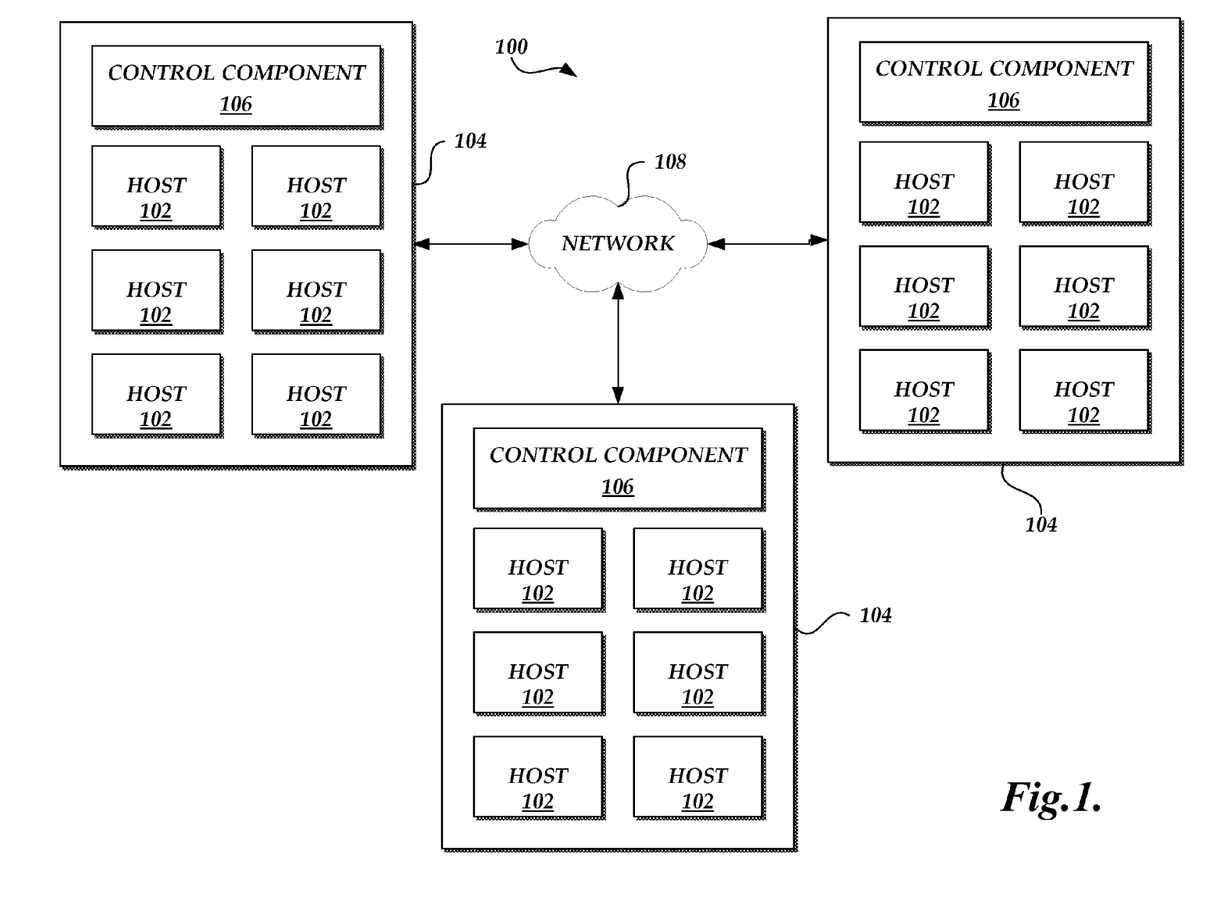
FIG. 1 is a block diagram depicting an illustrative environment for managing host computing devices including a number of host computing devices and control components.

With reference now to FIG. 1, a block diagram depicting an illustrative host computing device environment 100 for managing host computing devices will be described. The host computing device environment 100 includes a plurality of host computing devices 102. Illustratively, the host computing devices 102 correspond to server computing device having one or more processors, memory, operating system and software applications that can be configured for a variety of purposes. Additionally, the host computing devices 102 may be configure to host one or more virtual machine instances. As illustrated in FIG. 1, the plurality of host computing devices 102 are organized according to a physical placement of a set of host computing devices, such as a rack or other support structure. The organization of each set of host computing devices 102 will be generally referred to as a rack 104.

In an illustrative embodiment, each rack 104 is associated with a host computing device control component 106, which can also be referred to as a rack control component. The host computing device control component 106 can manage the operation of the set of host computing devices 102, or components thereof, including, but not limited to provisioning, updating, monitoring, and modifying software associated with the host computing devices. The host computing device control component 106 also includes a state monitoring component for monitoring the state of the operation of the host computing device control component 106 and providing visual indicators corresponding to the determined state of operation. Illustrative components of the host computing device control component 106 will be described with regard to FIG. 2. Although the host computing device control component 106 is illustrated with regard to a set of host computing devices organized according to physical racks, one skilled in the relevant art will appreciate that a host computing device control component 106 may be associated with sets of host computing devices organized according to different organizational criteria.

As illustrated in FIG. 1, the multiple racks 104 of host computing devices 102 may communicate via a communication network 104, such as a private or public network. For example, host computing device control components 106 from each rack 104 may be able to communicate with each other via the communication network 108, which can include a private communication network specific to host computing device control components. One skilled in the relevant art will appreciate that each rack 104 may include any number of host computing devices 102 and that the host computing device environment 100 can include any number of racks 104. Still further, the racks 104 may be further organized in a manner that does not require connectivity between all the racks in the host computing device environment.

Figure 2:
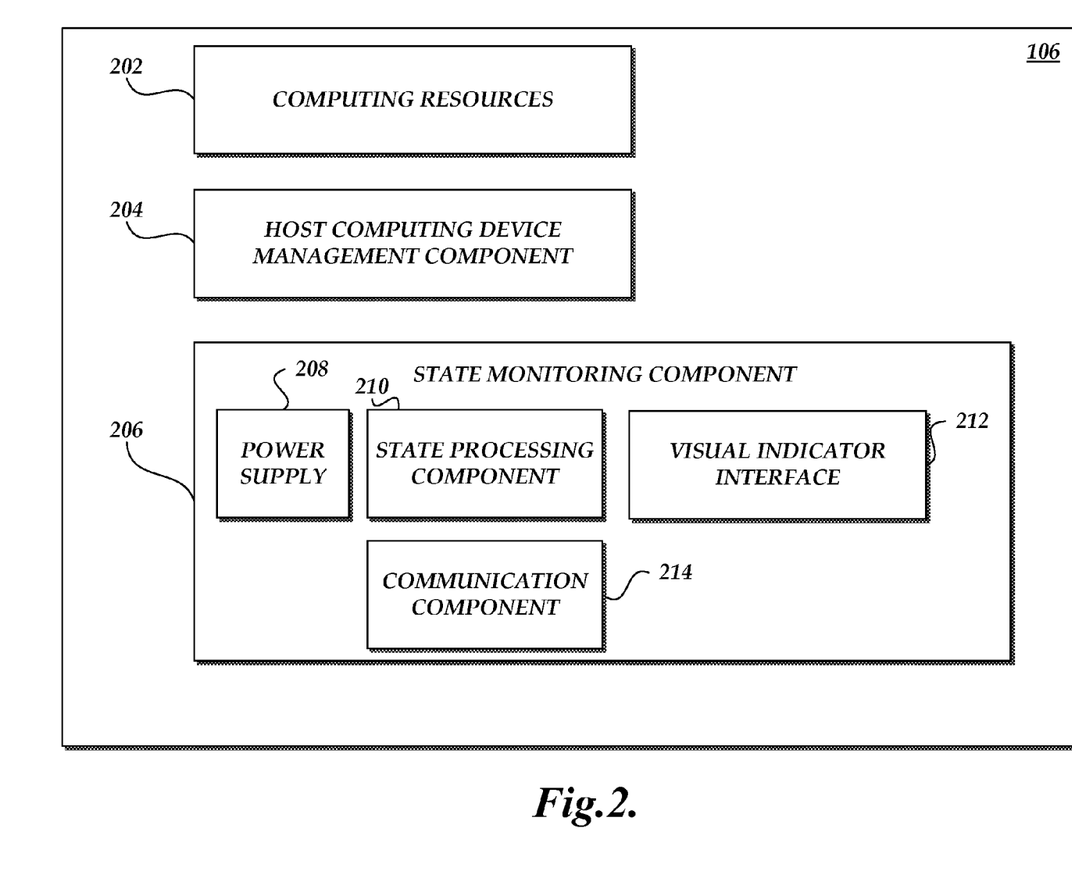
FIG. 2 is a block diagram illustrative of components of a control component for utilization in the environment for managing host computing devices of FIG. 1.

Turning now to FIG. 2, illustrative components of a host computing device control component 106 in the host computing device environment 100 will be described. In an illustrative embodiment, the host computing device control component 106 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. The content delivery environment 100 can include any of number and various kinds of host computing device control components 106, which may be customized according to specific racks 104 or types of racks.

Illustratively, the client computing devices 102 may have varied local computing resources such as central processing units and architectures, memory, mass storage, graphics processing units, communication network availability and bandwidth, etc. Generally, however, each host computing device control component 106 may include various computing resources 202 that can include one or more processing units, such as one or more CPUs. The computing resources 202 may also include system memory, which may correspond to any combination of volatile and/or non-volatile storage mechanisms. The system memory may store information that provides an operating system component, various program modules, program data, or other components. The host computing device control component 106 performs functions by using the processing unit(s) to execute instructions provided by the system memory. The computing resources 202 may also include one or more input devices (keyboard, mouse device, specialized selection keys, touch screen interface, stylus, etc.) and one or more output devices (displays, printers, audio output mechanisms, etc.). The computing resources 202 may also include one or more types of removable storage and one or more types of non-removable storage. Still further, the computing resources can include hardware and software components for establishing communications over the communication network 108, such as a wide area network or local area network, or via an internal communication network connecting the set of host computing devices 102. For example, the host computing device control component 106 may be equipped with networking equipment and software applications that facilitate communications via the Internet or an intranet.

However, although various computing resources 202 have been identified, ones skilled in the relevant art will appreciate that various combinations of computing resources may be implemented on a host computing device control component 106 and that one or more of the identified computing resources may be optional.

As illustrated in FIG. 2, the host computing device control component 106 can include, among other hardware or software components, a management component 204 for facilitating management of the set of host computing devices 102. As discussed above, the management component 204 can facilitate various interactions with one or more of the set of host computing devices 102 including, but not limited to, provisioning, updating, monitoring, and modifying software associated with the host computing devices. Although the management component 204 is illustrated as a single component, one skilled in the relevant art will appreciate that the management component 204 may be made up of a number of components or subcomponents to carry out one or more management functions associated with the host computing device control component 106.

The host computing device control component 106 can also include a state monitoring component 204 for monitoring the state of the operation of the host computing device control component 106 and providing visual indicators corresponding to the determined state of operation. The state monitoring component 204 can include various components, or subcomponents for monitoring or processing the state of operation of the state monitoring component for monitoring the state of the operation of the host computing device control component 106 and providing visual indicators corresponding to the determined state of operation of the host computing device control component 106. In one aspect, the state monitoring component 204 includes a power supply 208 for providing power to one or more components of the state monitoring component 204. Illustratively, the power supply 208 is independent of any power supply associated with the host computing device control component 106 such that a loss of power by the host computing device control component 106 does not result in a loss of power to the state monitoring component 204. For example, the power supply 208 may correspond to a battery or other capacitive device. The state monitoring component 204 can also include a state processing component 210 for determining an operating state of the rack control component based on one or more inputs provided to the state monitoring component 204 or based on a failure to receive inputs. The state monitoring component 204 can also determine various reboot parameters in the event of detection of a power event (e.g., a power outage or low power event) and initiate a reboot based on the reboot parameters.

The state monitoring component 204 can also include visual indicator interface component 212 for causing the generation of visual indicators, or other indicators, based on various determined operating states of the host computing device control component 106. In one embodiment, the visual indicator interface component 212 can include or be in direct communication with hardware for making the visual indications, including, but not limited to, liquid crystal displays ("LCD"), light emitting diodes ("LED"), sets of LCDs, sets of LEDs, multi-color LEDS, sets of multi-color LEDS and various combinations thereof. In another embodiment, the hardware for making the visual indications may be part of the computing resources 202 such that the visual indicator interface 212 is in communication (directly or indirectly) to cause the generation of various visual indicators as will be described below.

The state monitoring component 204 can further include a communication component 214 for establishing communications with other state monitoring components 204 or other reporting services as described in the present application. In an illustrative embodiment, the communication component 214 can include various hardware and software components utilized to exchange information via one or more communication paths. The communication paths can include wireless communication paths (via infrared, RF, optical, terrestrial, satellite communication media, etc.), wired communication paths, or a combination thereof. Although aspects of the present disclosure will be described with regard to an illustrative communication device environment and component interactions, communication protocols, flow diagrams and interfaces, one skilled in the relevant art will appreciate that the disclosed embodiments are illustrative in nature and should not be construed as limiting.

Figure 3A:
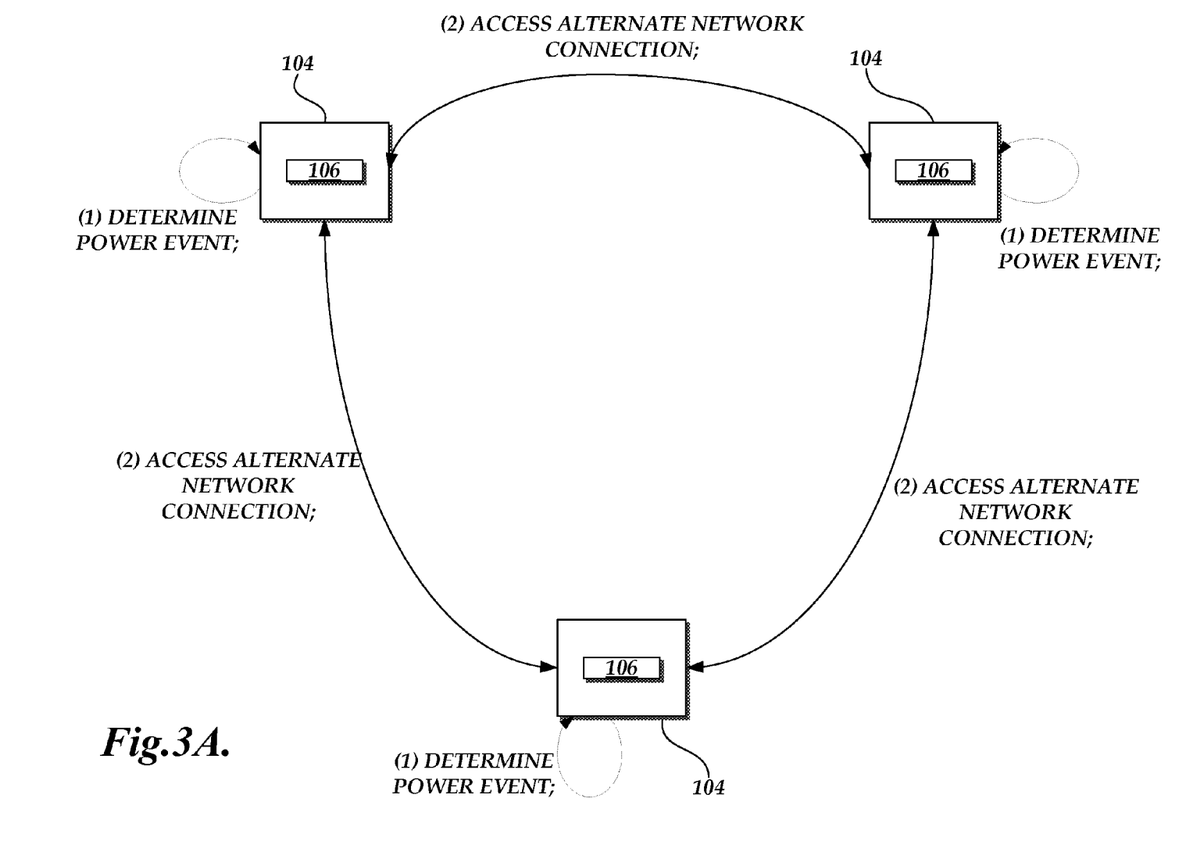
FIGS. 3A and 3B are block diagrams of the host computing device environment of FIG. 1 illustrating the processing of power events and determination of reboot parameters.
Figure 3B:
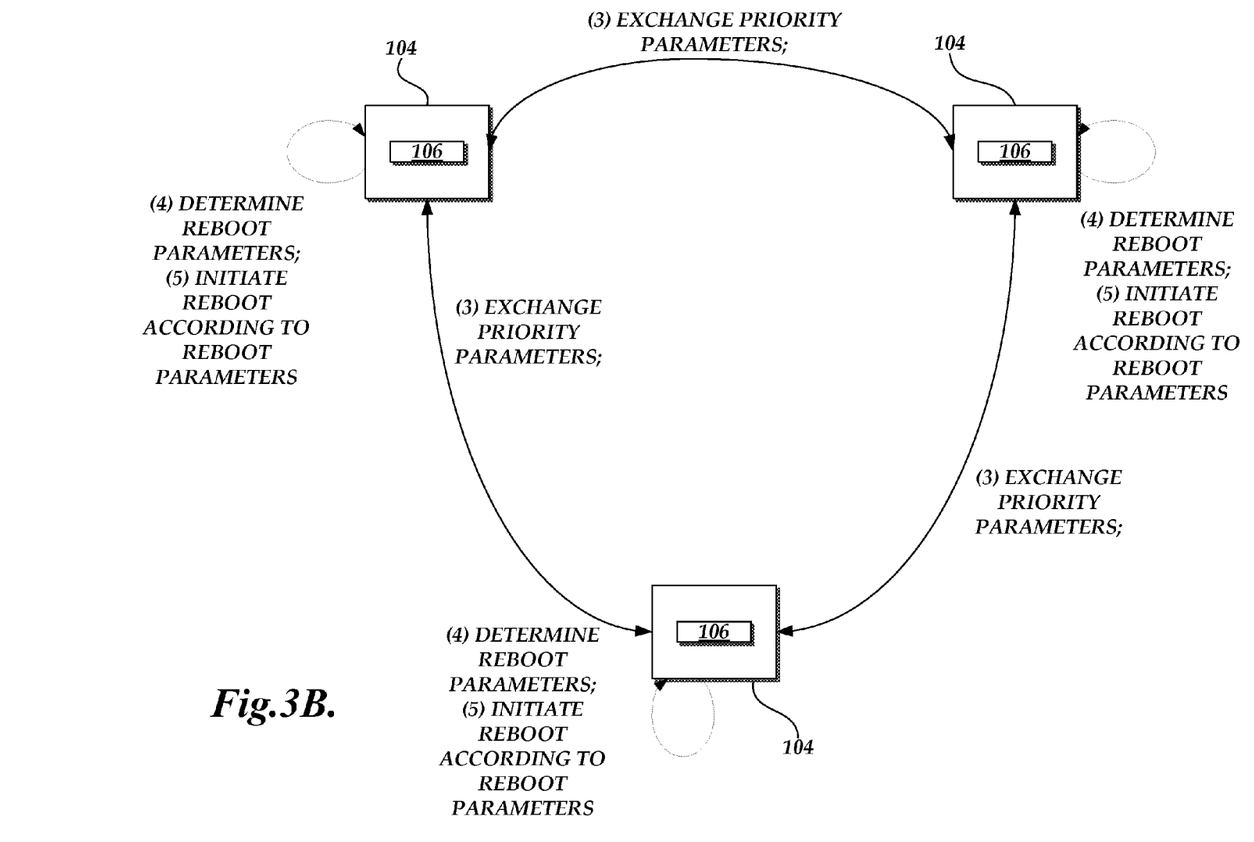

With reference now to FIGS. 3A and 3B various interactions between the components of the host computing device environment 100 will be described. For purposes of the illustrative embodiment, however, many of the components of the host computing device environment 100 have been omitted. Accordingly, one skilled in the relevant art will appreciate that additional or alternative components may be utilized in conjunction with the illustrated embodiments. Additionally, although FIGS. 3A and 3B will be described with regard to an illustrative power event, one skilled in the relevant art will appreciate that similar interaction may also occur with regard to other types of event information.

With reference to FIG. 3A, the state monitoring component 204 of one or more host computing device control components 106 determines a power event. Illustratively, a power event can correspond to a determination that one or more host computing devices 102 in a corresponding rack 104 no longer have power. Alternatively, a power event can correspond to a determination that one or more aspects of the power provided to one or more host computing devices 102 has fallen below an established threshold, such as a minimum current or voltage.

In an illustrative embodiment, because the state monitoring component 204 of the host computing device control component 106 includes a separate power supply component 208, the state monitoring component 204 can continue to operate even if there is a disruption to the power supply provided to the host computing device control component 106 and set of host computing devices 102. Accordingly, the state monitoring component 204 then establishes an alternative network connection via the communication component 214. Illustratively, the state monitoring component 204 attempts to establish communication with one or more other state monitoring components. For example, the state monitoring component 204 can attempt to construct or join a mesh network made of up other state monitoring components. In this example, the state monitoring component 204 may utilize a short range wireless communication protocol to establish a network connection with one or more state monitoring components that are within a maximum range. Because the power available from the power supply 208 may be limited, the state monitoring component 204 may be operating on a low power, short range communication path. The alternative network connection can correspond to a portion of the communication network 108 utilized by the set of host computing devices 102 or a completely separate communication network isolated from any communication channel accessible to the host computing devices. In an alternative embodiment, the host computing device control component 106 can maintain the communication channels independent of the determination of a power event (or other event). Accordingly, in these embodiments, the host computing device control component 106 would be able to utilize the previously established communication channels.

Turning to FIG. 3B, in this illustrative embodiment, it is assumed that the state monitoring component 204 can establish communication with two other state monitoring components or that such a communication channel has previously been established. Once the communication network is established, the state monitoring components exchange priority parameters associated the operation of the set of host computing devices. Illustratively, the priority parameters correspond to information that will be utilized to establish a relative priority for rebooting the set of hosts at each respective rack. In one aspect, the priority parameters can correspond to a single set of parameters that will apply to an entire set of host computing devices 102 or to a collection of parameters that will apply to portions of the set of host computing devices 102. The priority parameters can be based on a priority assigned based on one or more of the set of host computing devices 102, such as based on how individual host computing devices have been provisioned or configured. In another aspect, the priority parameters can be based on a priority assigned by a system administrator associated with one or more of the host computing devices, users of the host computing devices, or system administrator associated with the rack 104 or host computing device control component 106. The set of priority parameters may also be based on priorities associated with the host computing device control component 106 or the data currently being processed by the one or more host computing devices 102.

Based on the exchanged boot priorities, each state monitoring component 204 can then determine reboot parameters and initiate a reboot of one or more of the set of host computing devices in accordance with the reboot parameters. In one example, a state monitoring component 204 may determine that it is associated with a lower priority than other state monitoring components and will delay initiating reboot until confirmation that the other state monitoring components have successfully initiated and completed a reboot. In another example, a state monitoring component 204 may determine that it is associated with higher priority than other state monitoring components and will immediately attempt to initiate a reboot. In a further example, a state monitoring component 204 may determine that it is associated with substantially similar priority information and can initiate a reboot of one or more of the set of host computing devices. Additionally, to stagger the reboot of similarly prioritized reboots, the state monitoring component 204 can also process the priority information and add additional processing components, such as random, pseudo-random or fixed delays in initiating a reboot. The state monitoring component 204 can also factor in additional criteria, such as performance rankings, percentage utilization, historical information, and the like in factoring reboot parameters. Still further, the state monitoring component 204 can utilize thresholds that define a minimum number of host computing devices 102 that must determine a power event in order for the devices to jointly manage reboots.

Figure 4A:
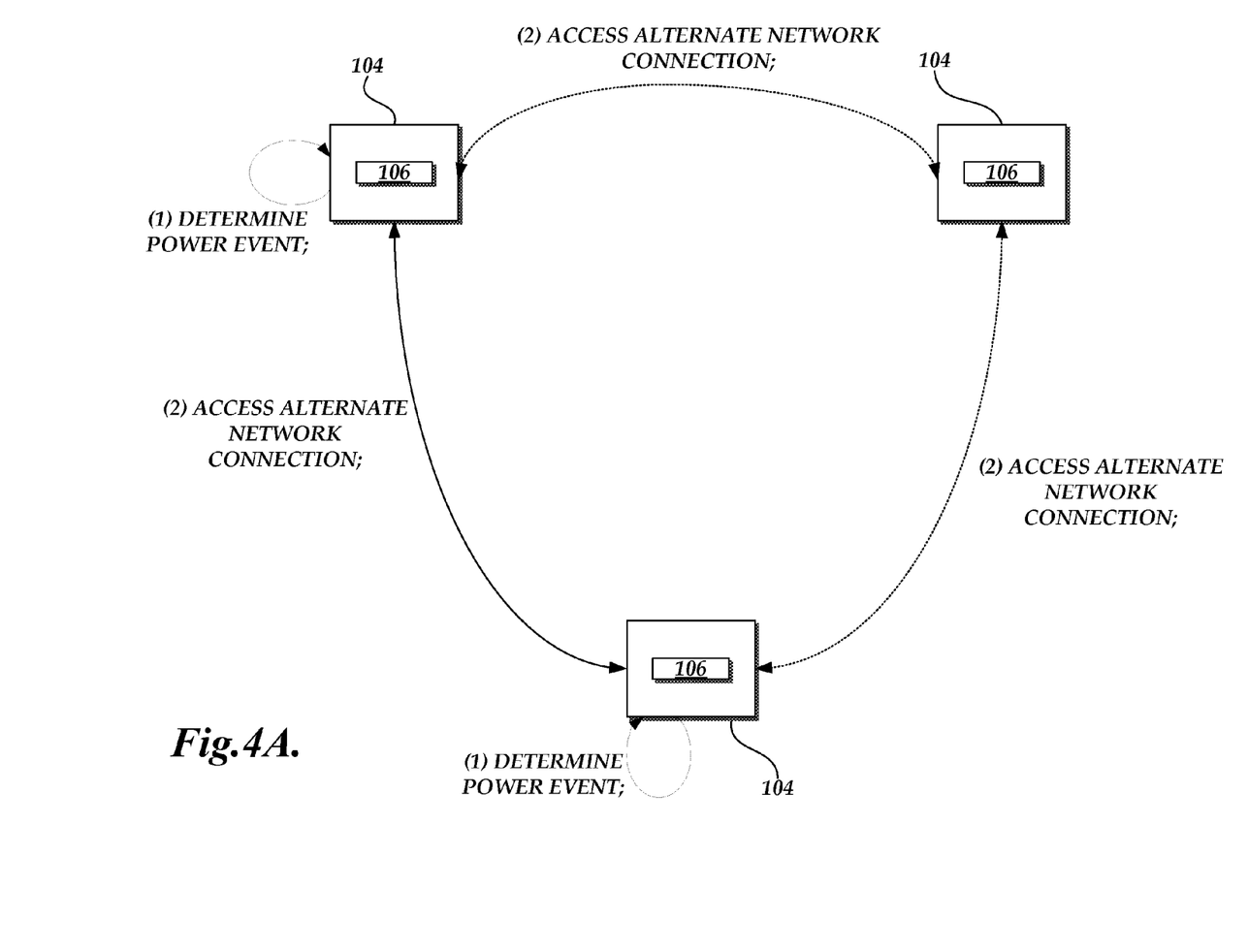
FIGS. 4A and 4B are block diagrams of the host computing device environment of FIG. 1 illustrating the processing of power events and determination of reboot parameters.
Figure 4B:
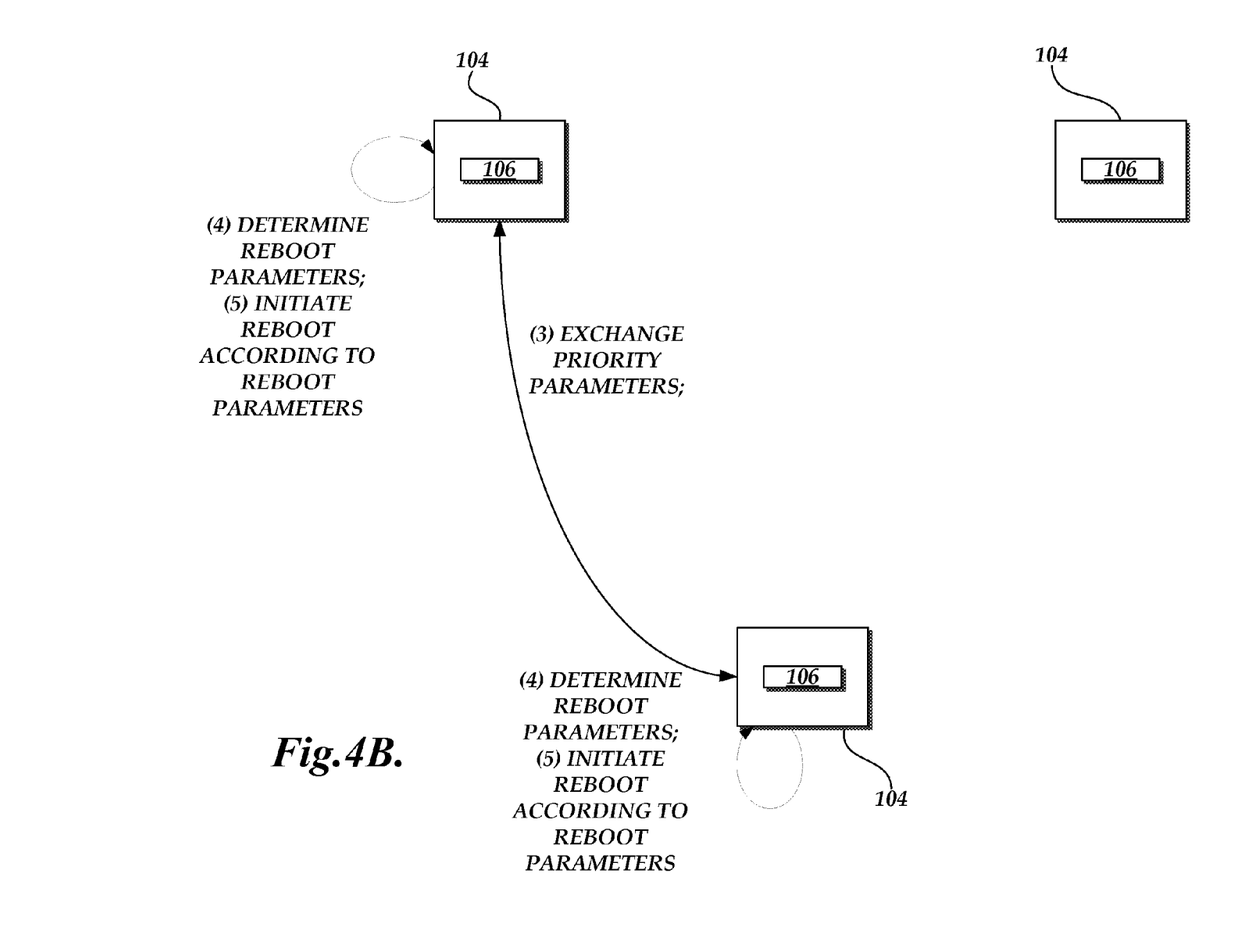

With reference now to FIGS. 4A and 4B various interactions between the components of the host computing device environment 100 in accordance with an alternative embodiment will be described. For purposes of the illustrative embodiment, however, many of the components of the host computing device environment 100 have been omitted. Accordingly, one skilled in the relevant art will appreciate that additional or alternative components may be utilized in conjunction with the illustrated embodiments. With reference to FIG. 4A, the state monitoring component 204 of two computing device control components 106 determines a power event. In this illustrative embodiment, at least one state monitoring component 204 has not determined that there is a power event or is otherwise not effected by the power event. As previously described, a power event can correspond to a determination that one or more host computing devices 102 in a corresponding rack 104 no longer have power. Alternatively, a power event can correspond to a determination that one or more aspects of the power provided to one or more host computing devices 102 has fallen below an established threshold, such as a minimum current or voltage.

In an illustrative embodiment, because the state monitoring component 204 of the host computing device control component 106 includes a separate power supply component 208, the state monitoring component 204 can continue to operate even if there is a disruption to the power supply provided to the host computing device control component 106 and set of host computing devices 102. Accordingly, the state monitoring component 204 then establishes an alternative network connection via the communication component 214. Illustratively, the state monitoring component 204 attempts to establish communication with one or more other state monitoring components. As previously described, the alternative network connection can correspond to a portion of the communication network 108 utilized by the set of host computing devices 102 or a completely separate communication network isolated from any communication channel accessible to the host computing devices. As previously described, in an alternative embodiment, the host computing device control component 106 can maintain the communication channels independent of the determination of a power event (or other event). Accordingly, in these embodiments, the host computing device control component 106 would be able to utilize the previously established communication channels.

Turning to FIG. 4B, in this illustrative embodiment, it is assumed that the state monitoring component 204 can establish communication with at least one other state monitoring component that has determined a power event. As illustrated in FIG. 4B, the host computing device control component 106 in which no power event has been detected may not necessarily be utilized in the establishment of an alternative network connection. Alternatively, the host computing device control component 106 not detecting the power may be utilized to facilitate communications between other host computing device control components or to determine whether a threshold number of host computing device control components have determined the power event.

Once the communication network is established or the host computing device control component 106 can access a previously existing communication channel, the state monitoring components exchange priority information associated the operation of the set of host computing devices. Illustratively, the priority information corresponds to information that will be utilized to establish a relative priority for rebooting the set of hosts at each respective rack. In one aspect, the priority information can correspond to information that will apply to an entire set of host computing devices 102 or to a collection of parameters that will apply to portions of the set of host computing devices 102. The priority information can be based on a priority based on one or more of the set of host computing devices 102, such as based on how individual host computing devices have been provisioned or configured. In another aspect, the priority information can be based on a priority associated with one or more of the host computing devices, users of the host computing devices, or the rack 104. The set of priority information may also be based on priorities associated with the host computing device control component 106 or the data currently being processed by the one or more host computing devices 102.

Based on the exchange boot priorities, each state monitoring component 204 can then determine reboot parameters and initiate a reboot of one or more of the set of host computing devices in accordance with the reboot parameters. In one example, a state monitoring component 204 may determine that it is associated with a lower priority than other state monitoring components and will delay initiating reboot until confirmation that the other state monitoring components have successfully initiated and completed a reboot. In another example, a state monitoring component 204 may determine that it is associated with higher priority than other state monitoring components and will immediately attempt to initiate a reboot. In a further example, a state monitoring component 204 may determine that it is associated with substantially similar priority information and can initiate a reboot of one or more of the set of host computing devices. Additionally, to stagger the reboot of similarly prioritized reboots, the state monitoring component 204 can also process the priority information and add additional processing components, such as random, pseudo-random or fixed delays in initiating a reboot. The state monitoring component 204 can also factor in additional criteria, such as performance rankings, percentage utilization, historical information, and the like in factoring reboot parameters.

Figure 5:
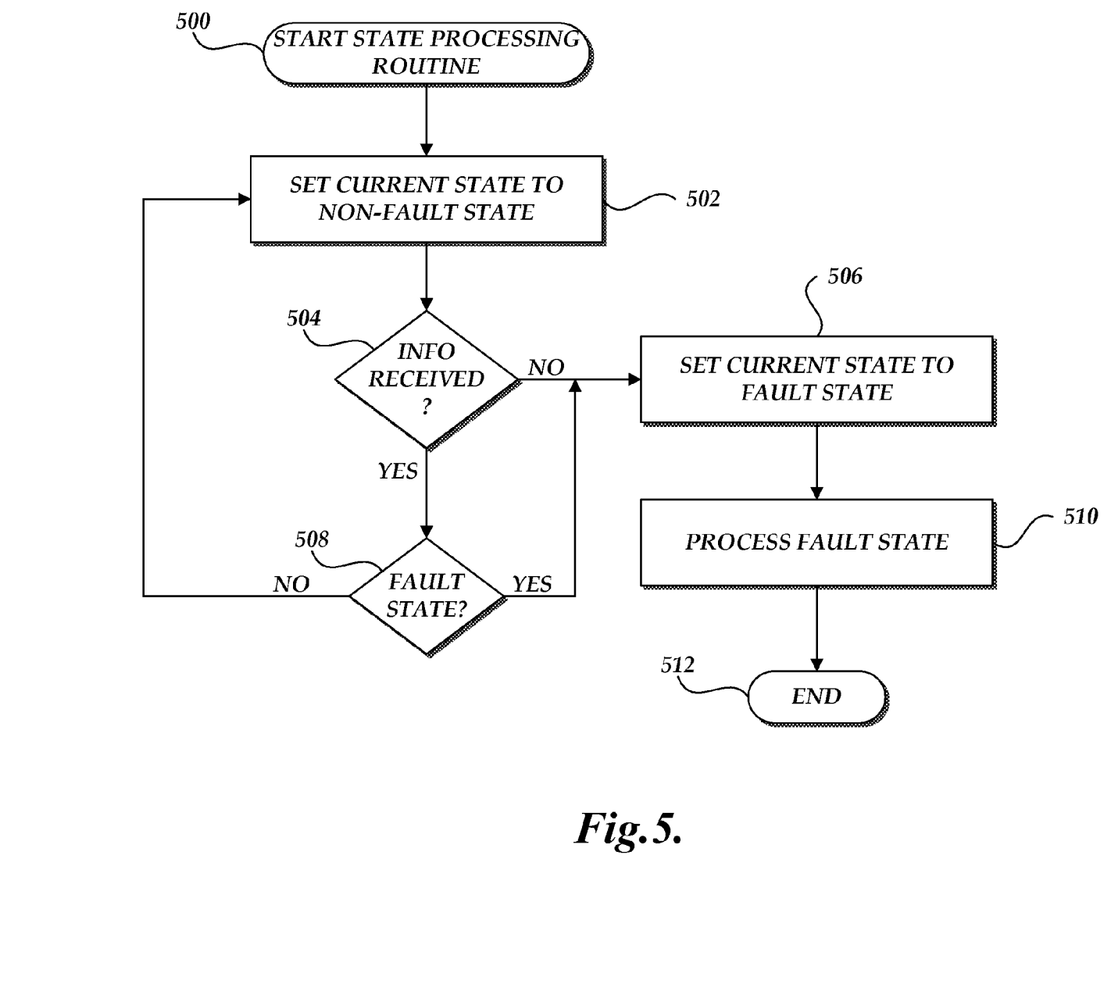
FIG. 5 is a flow diagram illustrative of a control component operating state processing routine implemented by a state monitoring component.

Referring now to FIG. 5, a flow diagram illustrative a control component operating state processing routine 500 will be described. For purposes of illustration, routine 500 will be described as implemented by a state monitoring component 206. However, one skilled in the art will appreciate that routine 500 may be implemented, at least in part, by other components of the host computing device environment 100. In one aspect, the state monitoring component 206 can maintain a default condition that corresponds to a non-fault determination for the host computing device control component 106. If the state monitoring component 206 obtains information associated with the function of the host computing device control component 106, the state monitoring component 206 can determine whether to modify the default state based on the information obtained from the host computing device control component 106. Additionally, if the state monitoring component 206 does not receive any information, it can determine whether to modify the default condition.

At block 502, the state monitoring component 206 sets the current state to a non-fault state. At decision block 504, the state monitoring component 206 determines whether it has received information regarding the operation of the host computing device environment 100 host computing device control component 106. Illustratively, the information regarding the operation of the host computing device control component 106 can include information regarding processor performance, operating system performance, network performance or power performance information. In one embodiment, the host computing device control component 106 can be configured to transmit the information to the state monitoring component 206. In another embodiment, the state monitoring component 206 can poll the host computing device control component 106 to obtain the information.

If at decision block 504, the state monitoring component 206 determines that it has not received information regarding the operation of the host computing device control component 106, the state monitoring component 206 sets the current state to a fault condition at block 506. In this embodiment, the failure to receive information from the host computing device control component 106 can be interpreted as a fault condition. The routine 500 then proceeds to block 510, which will be described below.

Referring again to decision block 504, if the state monitoring component 206 had received information regarding the operation of the host computing device control component 106, the state monitoring component 206 processes the information to determine whether a fault condition exists at decision block 508. Illustratively, the processing of the information associated with the host computing device control component 106 can correspond to a comparison of one or more thresholds that establish the presence of fault conditions. If at decision block 508, the processing of the information regarding the host computing device control component 106 is indicative of no faults, the routine 500 returns to block 502.

If at decision block 508, the processing of the information regarding the host computing device control component 106 is indicative of a fault condition, the routine 500 proceeds to block 506 where the state monitoring component 206 sets the current state to a fault state. At block 510, the state monitoring component 206 processes the fault condition. Illustratively, the state monitoring component 206 can generate one or more visual indicators based on the determined fault condition. In one embodiment, the state monitoring component 206 can utilize a single visual indicator for any fault condition. In another embodiment, the state monitoring component 206 can utilize multiple visual indicators based on a type of fault condition. For example, the state monitoring component 206 can associate a first color indicator for a fault condition indicative of needed repair fault state and a second color indicator for a fault condition indicative of a troubleshooting fault state. In a further embodiment, the state monitoring component 206 can associate a separate indicator, such as a flashing indicator, that can be associated with a power off condition for the host computing device control component 106. One skilled in the relevant art will appreciate that additional or alternative visual indicators may be implemented. At block 512, the routine 500 terminates.

Figure 6:
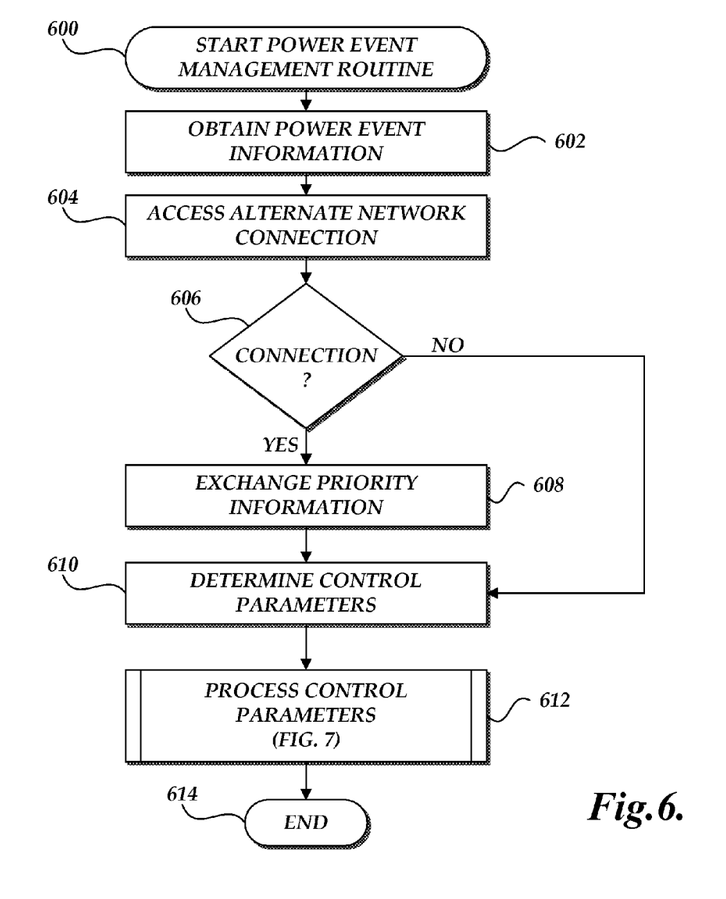
FIG. 6 is a flow diagram illustrative of power event management routine implemented by a state monitoring component.

Turning now to FIG. 6, a power event management routine 600 implemented by a state monitoring component 204 for processing event information will be described. Although routine 600 will be described with regard to managing power events related to power resources provided to the set of host computing devices 102 or the host computing device control component 106, routine 600 may be implemented with regard to the management of other events related to resource usage or resource availability by the set of host computing devices. At block 602, the state monitoring component 204 obtains power event information and determines a power event has occurred. As previously described, a power event can correspond to a determination that one or more host computing devices 102 in a corresponding rack 104 no longer have power. Alternatively, a power event can correspond to a determination that one or more aspects of the power provided to one or more host computing devices 102 has fallen below an established threshold, such as a minimum current or voltage. The power event information may be obtained by the host computing device management component 106 based on information provided by one or more host computing devices 102 or based on resource monitoring conducted by the host computing device management component.

At block 604, the state monitoring component 204 attempts to access communication with one or more other state monitoring components via the alternate network connection. In an illustrative embodiment, because a power event (or other event) has been determined, the state monitoring component 204 can assume that the communication network 108 utilized by the set of host computing devices 102 is unavailable or unreliable. Accordingly, the state monitoring component 204 utilizes the communication component 214 to attempt to contact other state monitoring components. As previously described, the alternative network connection corresponds to one or more communication paths, including wireless communication paths (via infrared, RF, optical, terrestrial, satellite communication media, etc.), wired communication paths, or a combination thereof. Additionally, in some embodiments, the host computing device control component 106 can maintain the alternative communication channels independently of the determination of an event. In such embodiments, the host computing device control component 106 can access a previously existing communication channel.

At decision block 606, a test is conducted to determine whether the state monitoring component 204 has established a connection with at least one other state monitoring component or can access a previously established communication channel. If not, the routine 600 proceeds to block 610, which will be described in greater detail below. Alternatively, if at decision block 606, the state monitoring component 204 is able to establish a connection with at least one other state monitoring component, at block 608, the state monitoring components exchange priority information. As previously described, the priority information corresponds to information that will be utilized to establish a relative priority for rebooting the set of hosts at each respective rack. In one aspect, the priority information can correspond to information that will apply to an entire set of host computing devices 102 or to a collection of parameters that will apply to portions of the set of host computing devices 102. The priority information can be based on a priority based on one or more of the set of host computing devices 102, such as based on how individual host computing devices have been provisioned or configured. In another aspect, the priority information can be based on a priority associated with one or more of the host computing devices, users of the host computing devices, or the rack 104. The set of priority information may also be based on priorities associated with the host computing device control component 106 or the data currently being processed by the one or more host computing devices 102.

At block 610, the state monitoring component 204 determines control parameters based on the exchanged priority information. Alternatively, no connection was determined at decision block 606, the state monitoring component 204 determines reboot parameters based on the priority information associated with the respective host computing device management component 106. As previously described, in one example, the control parameters may correspond to reboot parameters for controlling the reboot of multiple host computing devices 102. Accordingly, a state monitoring component 204 may determine that it is associated with a lower priority than other state monitoring components and will delay initiating reboot until confirmation that the other state monitoring components have successfully initiated and completed a reboot. In another example, a state monitoring component 204 may determine that it is associated with higher priority than other state monitoring components and will immediately attempt to initiate a reboot. In a further example, a state monitoring component 204 may determine that it is associated with substantially similar priority information/rankings and can initiate a reboot of one or more of the set of host computing devices. Additionally, to stagger the reboot of similarly prioritized reboots, the state monitoring component 204 can also process the priority information and add additional processing functionality, such as incorporating random, pseudo-random or fixed delays in initiating a reboot. The state monitoring component 204 can also factor in additional criteria, such as performance rankings, percentage utilization, historical information, and the like in factoring reboot parameters.

At block 612, the state monitoring component 204 causes the processing of the control parameters for a set of host computing devices 102. In one embodiment, the host computing device environment 106 can utilize various functions and interfaces for controlling the set of host computing devices 102 to initiate a reboot according to reboot parameters. In other embodiments, the control parameters can correspond to the initialization of a power management procedure. In another example, the control parameters can correspond to the initialization of a security protocol or a communication protocol. A subroutine for processing control parameter that cause the reboot of the set of host computing devices 102 will be described with regard to FIG. 7. However, one skilled in the relevant art will appreciate that additional or 1\At block 614, the routine 600 terminates.

Figure 7:
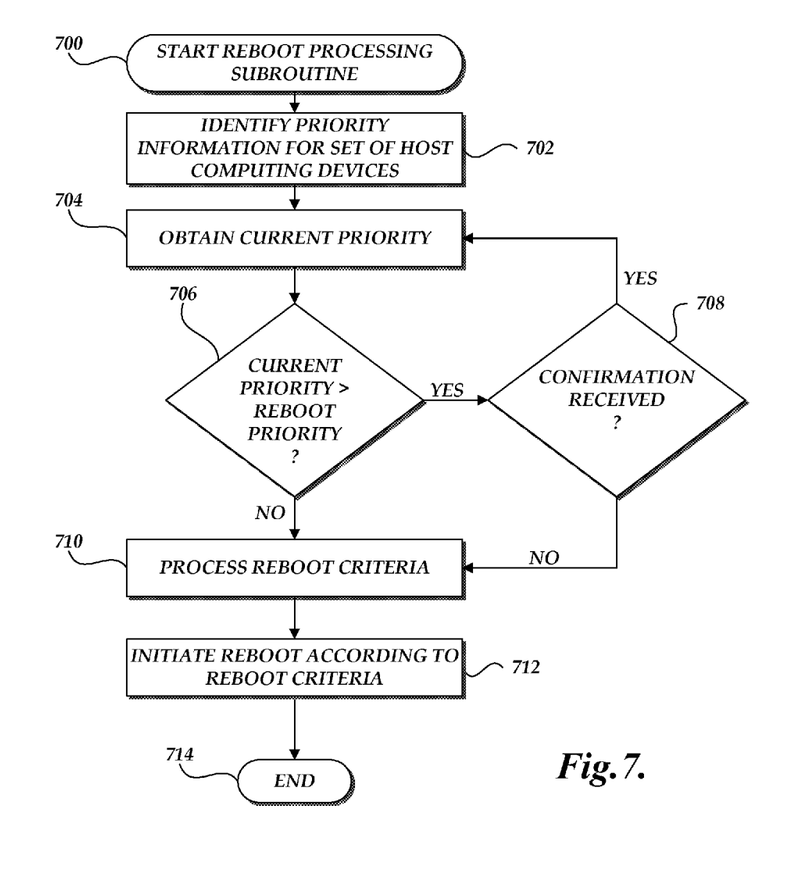
FIG. 7 is a flow diagram illustrative of a reboot processing subroutine implemented by a state monitoring component.

Turning now to FIG. 7, a reboot processing subroutine 700 implemented by a state monitoring component 204 for initiating a reboot of the set of host computing devices will be described. Illustratively, subroutine 700 may correspond to block 612 of routine 600 (FIG. 6). At block 702, the state monitoring component 204 obtains priority information for the set of host computing devices 102. At block 704, the state monitoring component 204 obtains a current priority associated with reboot of other racks 104. In an illustrative embodiment, the state monitoring component 204 will attempt to exchange information with other state monitoring components via the alternate communication network regarding priorities associated with other racks of host computing devices 102 and whether respective host computing device management components 106 have initiated a successful reboot of their host computing devices. If not communication network is available or if no other state monitoring component 204 is available, the current state monitoring component 204 can assume it has the highest priority.

At decision block 706, a test is conducted to determine whether the current priority is greater than the priority information for the set of host computing devices 102. If so, the state monitoring component 204 then proceeds to decision block 708 to determine whether it has received information from a state monitoring component 204 associated with a higher priority has successfully initiated a reboot of its respective set of host computing devices 102. In an illustrative embodiment, the host computing device control component 106 can also determine at decision block 706 whether a threshold number of host computing device control components have determined the event to cause the implementation of a management reboot. Additionally, in other embodiments, decision block 708 may be omitted. If confirmation is received, the subroutine 700 returns to block 704 to obtain an updated current priority.

Alternatively, if at decision block 706, the state monitoring component 204 determines that it has a higher or equal priority to the current priority exchanged between the state monitoring components or if at decision block 708, no confirmation is received from state monitoring components associated with a higher priority, at block 710, the state monitoring component 204 can process any additional reboot criteria. In one embodiment, the state monitoring component 204 can implement addition random, pseudo-random or fixed delays in initiating a reboot. The state monitoring component 204 can also factor in additional criteria, such as performance rankings, percentage utilization, historical information, and the like in determining an order for initiating a reboot of the set of host computing devices or initiating a delay in the reboot of the set off host computing devices. Still further, the state monitoring component 204 can also select subsets of the set of host computing devices 102 to reboot based on different priority information associated with the set of host computing devices 102. Still further, the host computing device control component 106 can determine that no reboot is required.

Based on the processed reboot criteria, at block 712, the state monitoring component 204 initiates a reboot of the set of host computing devices (or subsets thereof). As previously described, the host computing device environment 106 can utilize various functions and interfaces for controlling the set of host computing devices 102 to initiate the reboot of the set of host computing devices. At block 714, the sub-routine 700 returns.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing host computing devices, the host computing devices organized into a physical rack, the system comprising:
   a rack control component in communication with the host computing devices and associated with a power supply, the rack control component including:
      a management component for monitoring and controlling one or more aspects of the operation of the host computing devices; and
      a state monitoring component including:
         a state monitoring component power supply independent of a power supply associated with the host computing devices;
         a state processing component for determining power event information; and
         a communication interface for establishing communication with other state monitoring components;
      wherein the state monitoring component is configured to attempt to communicate with at least one other state monitoring component based on the occurrence of a determined power event, and
      wherein, if communication is established, the state monitoring component determines reboot parameters based, at least in part, on the determined power event and an exchange of priority information with the at least one other state monitoring component.

2. The system of claim 1, wherein the state monitoring component is further configured to communicate with the at least one other state monitoring components via an alternate communication channel independent of a communication channel associated with the host computing devices.

3. The system of claim 1, wherein the state monitoring component is further configured to cause initiation of a reboot of the host computing devices in accordance with the reboot parameters.

4. The system of claim 1, wherein the power event information corresponds to a determination of no power to the host computing devices.

5. The system of claim 1, wherein the power event information corresponds to a determination of power to the host computing devices below a threshold.

6. A computer-implemented method for managing host computing devices, the method comprising:
   under control of one or more processors configured with specific executable instructions for implementing a state monitoring component having a state monitoring component power supply independent of a power supply associated with a grouping of host computing devices,
   obtaining, by the state monitoring component, power event information, the power event information corresponding to a power event associated with the power supply of the grouping of host computing devices, the state monitoring component operating by using the state monitoring power supply after the occurrence of the power event;
   communicating, by the state monitoring component, with at least one other state monitoring component of a different grouping of host computing devices based on the occurrence of a determined power event; and
   determining, by the state monitoring component, reboot parameters for the grouping of host computing devices, the reboot parameters based, at least in part, on an exchange priority information with the at least one other state monitoring component.

7. The computer-implemented method of claim 6 further comprising causing instantiation of a communication channel independent of a communication channel associated with the grouping of host computing devices in response to the power event information.

8. The computer-implemented method of claim 7, wherein causing instantiation of a communication channel includes causing instantiation of at least one of a wired or a wireless communication channel.

9. The computer-implemented method of claim 6, wherein the power event information corresponds to a determination of no power to the grouping of host computing devices.

10. The computer-implemented method of claim 6, wherein the power event information corresponds to a determination of power to the grouping of host computing devices below a threshold.

11. The computer-implemented method of claim 6, wherein determining reboot parameters for the grouping of host computing devices includes determining reboot parameters is based solely on the priority information.

12. The computer-implemented method of claim 6, wherein the reboot parameters correspond to a delay in initiating a reboot of the grouping of host computing devices.

13. The computer-implemented method of claim 6 further comprising causing initiation of a reboot of the grouping of host computing devices based on the determined reboot parameters.

14. A state monitoring component for managing a grouping of host computing devices associated with the state monitoring component, the grouping of host computing devices associated with a power supply, the state monitoring component comprising:
   a state monitoring component power supply independent of the power supply associated with the grouping of host computing devices;
   a state processing component configured to determine event information associated with a determined event associated with the grouping of host computing devices; and
   a communication interface configured to communicate with other state monitoring components associated with the grouping of host computing devices;
   wherein the state monitoring component is configured to attempt to communicate with at least one other state monitoring component based on the determined event;
   wherein, if communication is established, the state monitoring component determines reboot parameters based, at least in part, on the determined event and an exchange of priority information with the at least one other state monitoring component.

15. The state monitoring component of claim 14 wherein the state monitoring component is further configured to communicate with the at least one other state monitoring components via an alternate communication channel independent of a communication channel associated with the host computing devices.

16. The state monitoring component of claim 14, wherein the control parameters correspond to a determined reboot order based on priority information.

17. The state monitoring component of claim 14, wherein the control parameters correspond to management of a power protocol.

18. The state monitoring component of claim 14, wherein the control parameters correspond to management of a security protocol.

19. The state monitoring component of claim 14, wherein the event information corresponds to a determination of no power to the grouping of host computing devices.

20. The state monitoring component of claim 14, wherein the event information corresponds to a determination of power to the grouping of host computing devices below a threshold.

* * * * *